(12) United States Patent
Ding et al.

(10) Patent No.: US 7,664,113 B2
(45) Date of Patent: Feb. 16, 2010

(54) APPARATUS AND METHODS FOR SYSTEM MULTIPLEXING AND PROGRAM ELEMENT IDENTIFICATION

(75) Inventors: Yaqiang Ding, Shanghai (CN); Jiang Lin, Shanghai (CN); Fu-Huei Lin, Cupertino, CA (US)

(73) Assignee: Spreadtrum Communications Inc., George Town, Grand Cayman (KY)

( * ) Notice: Subject to any disclaimer, the term of this patent is extended or adjusted under 35 U.S.C. 154(b) by 390 days.

(21) Appl. No.: 11/701,646

(22) Filed: Feb. 2, 2007

(65) Prior Publication Data

US 2008/0112406 A1    May 15, 2008

(51) Int. Cl.
*H04L 12/28* (2006.01)
*H04L 12/56* (2006.01)
*H04J 3/04* (2006.01)

(52) U.S. Cl. ............... 370/392; 370/394; 370/535
(58) Field of Classification Search .......... 370/389, 370/392, 394, 535
See application file for complete search history.

(56) References Cited

U.S. PATENT DOCUMENTS

| 2004/0213298 | A1* | 10/2004 | Sato .................... 370/537 |
| 2006/0024026 | A1* | 2/2006 | Yamashita et al. ........ 386/83 |
| 2006/0095410 | A1* | 5/2006 | Ostrover et al. ........... 707/3 |
| 2007/0086488 | A1* | 4/2007 | Kim et al. ............... 370/503 |

* cited by examiner

*Primary Examiner*—Alpus H Hsu
*Assistant Examiner*—Saad Hassan

(57) ABSTRACT

Apparatus and methods for system multiplexing and program element identification is disclosed. A multiplexer generates a sequence of transport packets and associated program element information tables (PEIT). The header of a transport packet carrying the PEIT includes a unique PEIT indicator. A de-multiplexer first locates the PEIT by the unique PEIT indicator in the transport packet header. The de-multiplexer utilizes the corresponding program element identifier (PEID) of the program specific information (PSI) to search for the required transport packet that contains the PSI. The de-multiplexer then locates and extracts the needed elementary streams by searching for the associated PEID in the PEIT. The elementary streams are then sent to decoders for further processing.

6 Claims, 5 Drawing Sheets

APPARATUS AND METHODS FOR SYSTEM MULTIPLEXING AND PROGRAM ELEMENT IDENTIFICATION

CROSS-REFERENCE TO RELATED APPLICATION(S)

This application claims priority to Chinese Patent Application No. 2006101183289 filed on Nov. 14, 2006, the disclosure of which is incorporated herein by reference in its entirety.

TECHNICAL FIELD

The present disclosure relates to methods for properly identifying video, audio or data program element from a signal stream; in particular, the present disclosure relates to a method for program element multiplexing and identification.

BACKGROUND

Presently, the techniques for program element multiplexing and identification mainly include those of the Thomson Inc. For example, the Chinese Patent (grant publication No. CN 1222168C) and the Chinese Patent Publication No. CN 1725843C disclose a method for processing multiplexed signals having multiple programs and information related to the programs. The method includes the following steps: receiving a multiplexed signal and identifying component signals that have predetermined Signal Component Identification (SCID) from the multiplexed signal. The SCID has different values for different program elements in the multiplexed signals. The method further includes programming multiple programmable match filters using the identified SCID from the multiplexed signal, filtering the multiplexed signal using the programmable match filters to determine the generation of the SCID programmed into the multiple programmable match filters, and further processing the various components of the program using the SCID based on the match filters.

The methods described above can identify audio, video, or data programs from a multiplexed signal effectively. However, the method needs to program multiple match filters using the SCID identified from the multiplexed signal and then processing the various components of the program using the multiple match filters. Therefore, the method includes complex processing steps, and a receiving terminal cannot process missing component identification information or program identification after error has occurred due to transmission signal errors.

DETAILED DESCRIPTION

Overview

This present disclosure provides a method for system multiplexing and program element identification for improving identification and transmission efficiency of program elements.

One aspect of the present disclosure relates to a method for system multiplexing and program element identification implemented between a multiplexer and a de-multiplexer, and has the following characteristics.

The multiplexer generates a sequence of transport packets and an associated program element information table (PEIT) describing the sequence of transport packets. The PEIT table provides information needed for program element identification and de-multiplexing and indicates the locations of different program elements in the sequence of transport packets. The location can be determined by the sequencing and count information among various program elements. The header of a transport packet carrying the PEIT table includes a unique PEIT indicator (PEIT_indicator).

The de-multiplexer first locates the PEIT table using the PEIT indicator contained in the transport packet header and identifies and extracts program elements according to the location information of program elements contained in the PEIT packet. The de-multiplexer utilizes the program element identifier (PEID) corresponding to particular program specific information (PSI) to search for the required transport packet that contains PSI in the PEIT sequence based on the location information contained in the PEIT. The PSI is then parsed to reconstruct the complete program structure of the video and/or audio elementary streams of the program. Based on the program structure obtained, the de-multiplexer locates and extracts the needed transport packets from the multiplexed signal by using the PEID corresponding to the elementary streams and the location information in the PEIT. The extracted elementary stream packets are then sent to elementary stream processors for processing.

One aspect of the method for system multiplexing and program element identification is that the multiplexer periodically collects a packet sequence and disposes the packet sequence in a PEIT interval buffer. Then the position and count information of individual program elements contained in the buffer are recorded. The position and count information is then inserted into a corresponding memory. Then, the multiplexer inserts one or more PEIT packets describing the packet sequence contained in the PEIT interval buffer.

Another aspect of the method for system multiplexing and program element identification is that the multiplexer periodically disposes the collected packet sequence into a reorder buffer, reorders the packet sequence in the reorder buffer according to a predetermined rule, and records the position and count information of individual program elements after the reordering. The recorded position and count information is stored in a corresponding memory.

Another aspect of the method for system multiplexing and program element identification is that each PEIT interval corresponds to a PEIT table.

Another aspect of the method is that the PEIT can be placed in advance to the PEIT interval that the PEIT describes.

Another aspect of the method for system multiplexing and program element identification is that the description in the PEIT includes the number of packets between the PEIT and the corresponding PEIT interval, the total number of packets contained in the PEIT interval, the number of consecutive packets having the same program element, PEID, and other information.

Another aspect of the method for system multiplexing and program element identification is that the multiplexer employs a Packet Link Table (PLT) to correct errors, and the identification of a packet's position is achieved by the introduction of the PEIT and a Transport Packet sequence number. The multiplexer associates the information of the Anchor Packet (AP) with the Linked Packet (LP) that has the same program element. The multiplexer sets PLT to update the position information of AP and writes the position information into the header field of the LP. In case there are errors or loss in the PEIT, the multiplexer can recognize program elements of LP by searching the reconstructed PLT. One LP can be linked to one AP, or one LP can be linked to multiple AP's.

A further aspect of the method for system multiplexing and program element identification is that the multiplexing stream can have two multiplexing modes. A basic mode implements PEIT, while an advanced mode also includes a PLT and packet locating technique in addition to PEIT. The selection of the multiplexing mode is configured by setting an advance mode enable flag in the PEIT table.

Method and System for Multiplexing and Program Element Identification

One embodiment of the present invention relates to a method for system multiplexing and program element identification implemented between a multiplexer and a de-multiplexer, and has the following characteristics.

The multiplexer generates a sequence of transport packets and an associated program element information table (PEIT) describing the sequence of transport packets. The PEIT table provides information needed for program element identification and de-multiplexing and indicates the locations of different program elements in the sequence of transport packets. The location can be determined by the sequencing and count information among various program elements. The header of a transport packet carrying the PEIT table includes a unique PEIT indicator (PEIT_indicator).

The de-multiplexer first locates the PEIT table using the PEIT indicator contained in the transport packet header and identifies and extracts program elements according to the location information of program elements contained in the PEIT packet. The de-multiplexer utilizes the program element identifier (PEID) corresponding to particular program specific information (PSI) to search for the required transport packet that contains PSI in the PEIT sequence based on the location information contained in the PEIT. The PSI is then parsed to reconstruct the complete program structure of the video and/or audio elementary streams of the program. Based on the program structure obtained, the de-multiplexer locates and extracts the needed transport packets from the multiplexed signal by using the PEID corresponding to the elementary streams and the location information in the PEIT. The extracted elementary stream packets are then sent to elementary stream processors for decoding and playing.

The following description provides further explanation of the present invention by using two examples. To optimize the transport efficiency in different transmission conditions, two multiplexing modes, a basic mode and an advanced mode are used. The selection of the multiplexing mode is configured by setting an advance mode enable flag in the PEIT table. The basic mode can be applied to low error rate transport channels where packets can arrive in sequence, such as digital cable television broadcast channels. The advanced mode can be applied to high packet loss or high error rate transport channels where the packets are likely to arrive out-of-order, such as IPTV network, and mobile TV channel. In the following description, a transport stream is used as an example, and a program stream or other streams can be processed by the same techniques.

Basic Mode—Multiplexing

The multiplexer periodically disposes a collected sequence of packet sequence in a PEIT interval buffer, and records the number of packets in the buffer according to the corresponding program elements. The position and count information is then inserted into a corresponding memory in sequence. Then, the multiplexer inserts one or more Program Element Information Table (PEIT) packets describing the packet sequence contained in packet sequence in the PEIT interval buffer.

The multiplexer can reorder the packet sequence to compress the PEIT table. For example, when 100 video packets and 101 audio packets enters the buffer alternatively, the PEIT needs 201 entries to represent these packets. However, through reordering without affecting decoding synchronization, the PEIT can be compressed into two entries and thus the required transmission bandwidth can be reduced. In fact, the multiplexer can pre-configure a sequencing rule for each PEIT interval. The sequencing rule provides the ordering of multiple programs and their program elements in the packet sequence. The source stream can be real time video and/or audio streams encoded by real time encoders or can be streams already multiplexed. The reorder buffer includes a counter that records the number of packets entering the buffer to ensure storing a predetermined number of packets and individually records the same kinds of packets that belong to the same program or program elements. The recorded number is stored. The packet sequence after reordering can satisfy the pre-configured sequencing.

Besides maximally compressing the PEIT table after reordering, the reordering process should also comply with some constraints. For example, 1) the stream produced from the reordering process should comply with the constraints of the system target decoder, e.g., by ensuring that the decoder buffer does not overflow or underflow; 2) the relative sequence of packets having the same component should not change; and 3) the produced multiplexed stream should have a jittering less than 5 ms.

Figure 1:
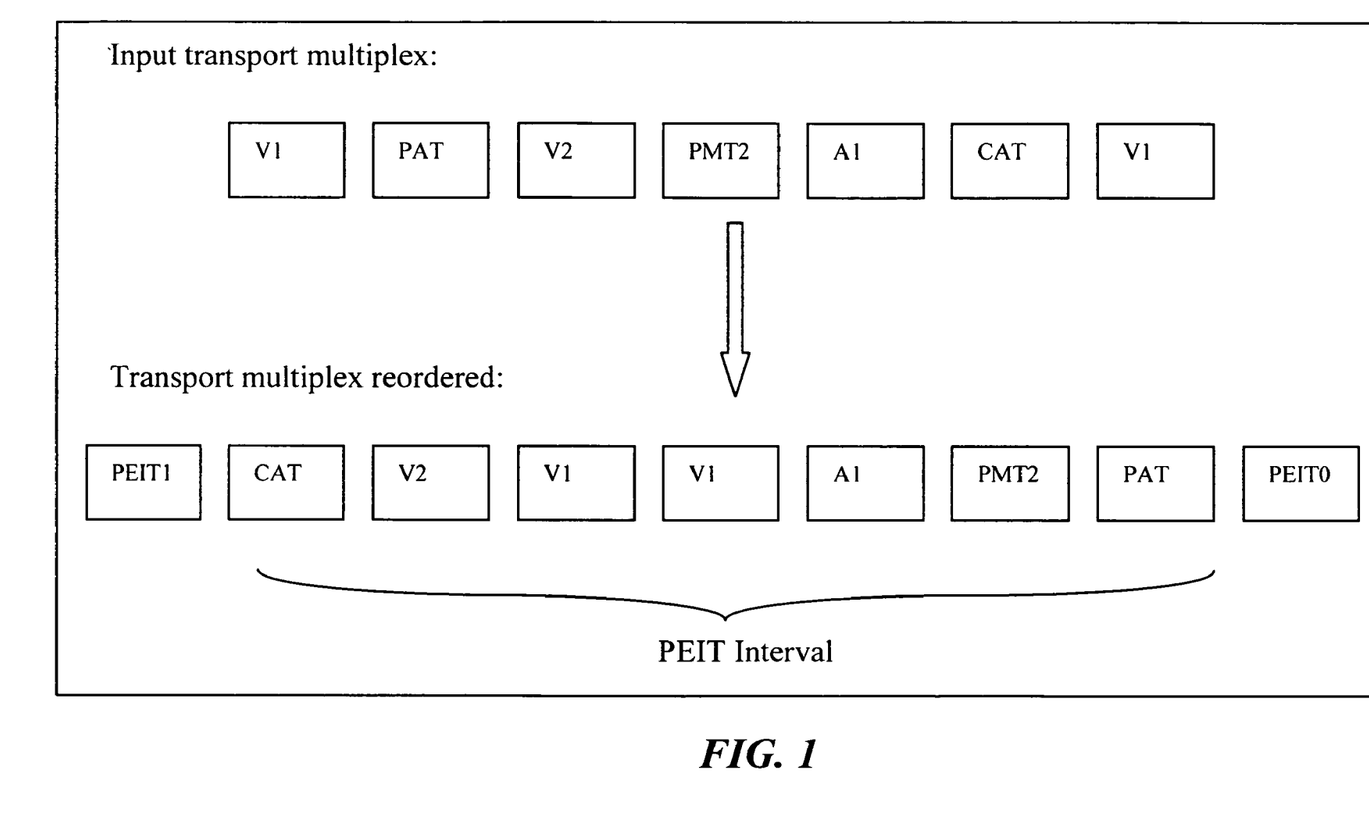
FIG. 1 is a flowchart showing a reordering process in accordance with an embodiment of the invention.

FIG. 1 illustrates a reordering process. As illustrated in the figure, the input is a transport packet sequence that needs to be reordered, which includes a program associate table (PAT), a program map table (PMT), a conditional access table (CAT), a video packet V1 and an audio packet A1, and a video packet V2 for a second program. As shown in the figure, after the reordering, packets 1 and 2 are ordered sequentially according to their program numbers, and each of the video and audio packets are sequenced according to the sequencing rule. The PSI information packets are sequenced according to the chosen sequence in the present reordering buffer.

Figure 2:
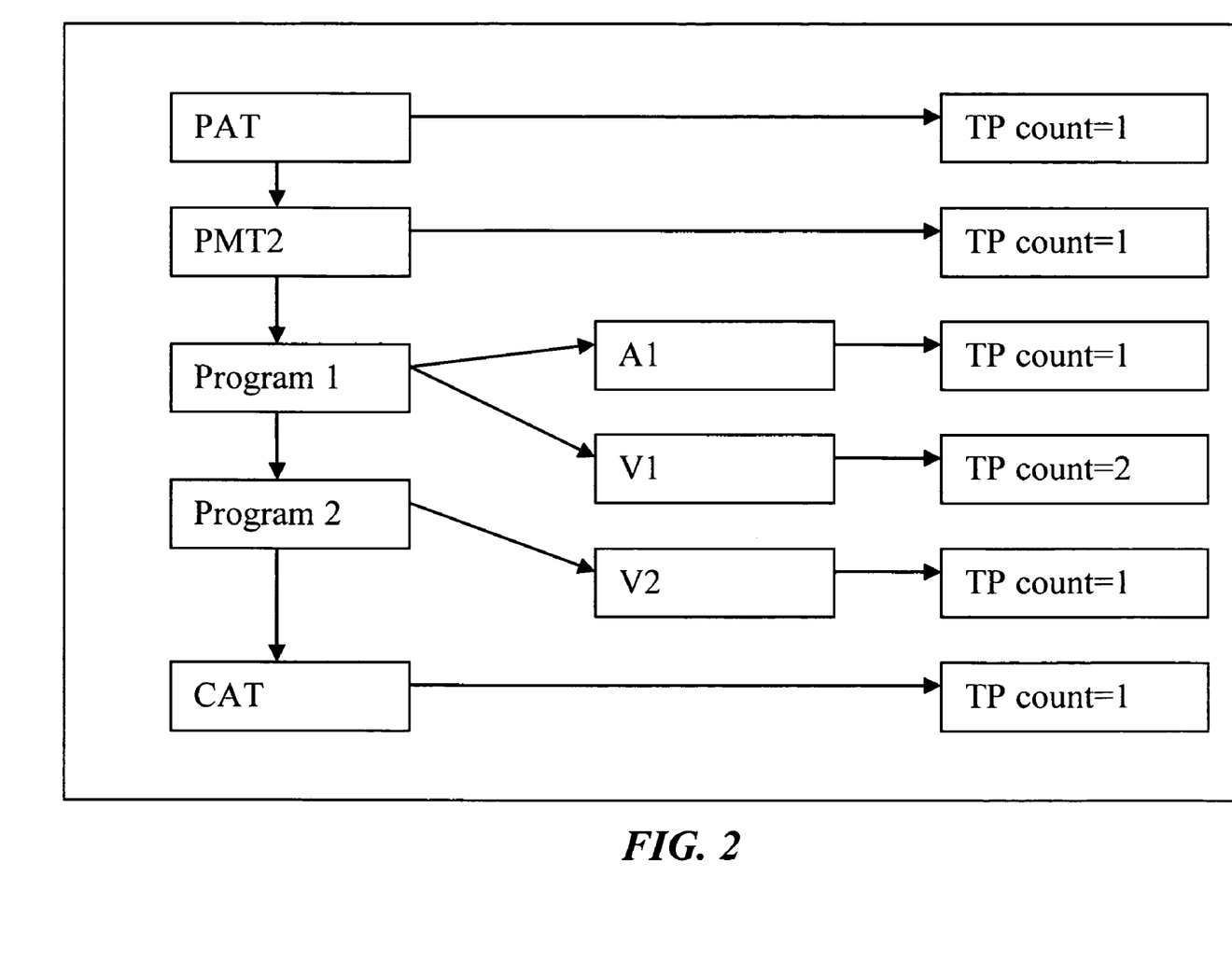
FIG. 2 is a PEIT table structure in accordance with an embodiment of the invention.

The multiplexer configures a sequence of the program elements in the PEIT table and a basic structure of the program elements after the sequencing of the program elements are determined. For example, the sequence of the programs and program elements are determined. The table structure of the reordered PEIT is shown in FIG. 2.

After the reordering of the packets described above, the output sequence of packets is called a PEIT sequence, while the transport packet sequence described by a single PEIT is called a PEIT interval. Each PEIT interval can correspond to a PEIT table, or a single PEIT table can correspond to multiple PEIT intervals.

The length of a PEIT interval can be determined by the multiplexer based on the particular application. The PEIT interval length can be fixed or variable. Typically, a fixed PEIT interval length can be used. During the reordering process, the multiplexer also count the number of transport packets that contain the same program element. As illustrated in FIG. 2, this count is written into the "leaf" of the program element that corresponds to the PEIT composite tree.

Figure 3:
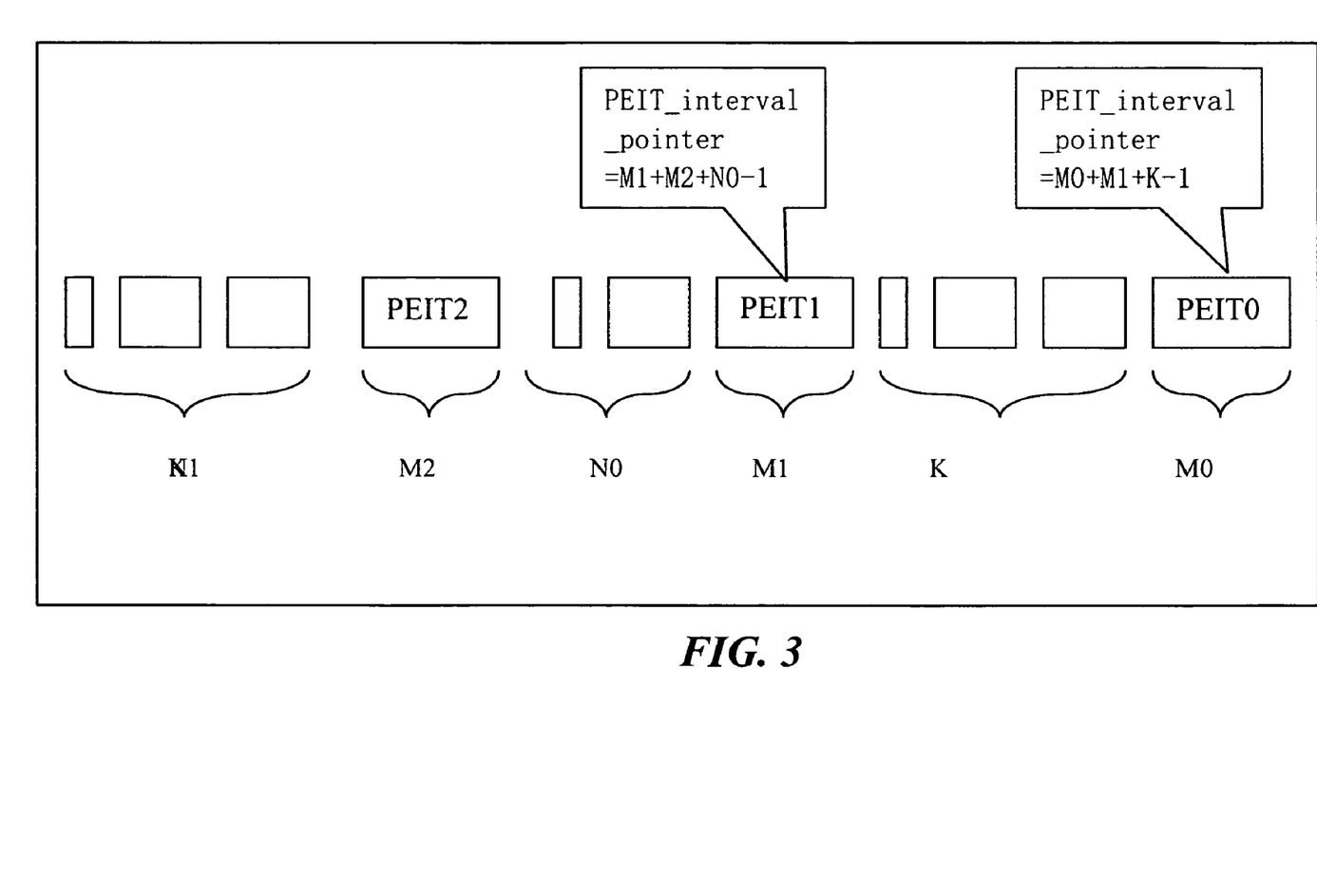
FIG. 3 is a flowchart showing an in-advance placement of PEIT in accordance with an embodiment of the invention.

The completed PEIT table is then packaged and inserted in front of the PEIT interval that the PEIT describes and then transmitted via a transmission network. The header of the transport packet carrying the PEIT table includes a PEIT indicator (PEIT_indicator). The PEIT table does not need to be immediately adjacent to the PEIT interval that the PEIT table describes. For ease of implementation, typically, the PEIT table is placed in front of the corresponding PEIT interval. The PEIT can be transmitted one interval ahead of the PEIT interval so that the receiver can have sufficient response time for de-multiplexing. The receiver can obtain the starting position of the PEIT interval based on description information that the multiplexer has written into the PEIT table. Assuming, the parameter PEIT_interval_pointer represents the number of transport packets between the first transport packet of the PEIT table and the first transport packet of the corresponding PEIT interval, as illustrated in FIG. 3, PEIT0 and PEIT1 are individually packetized into sections and then further encapsulated into M0 and M1 transport packets, respectively. Also, the respective corresponding PEIT intervals for PEIT0 and PEIT1 have a length of N0 and N1 transport packets. Then, the multiplexer can insert K empty packets after PEIT0 and set the parameter PEIT_interval_pointer with a value of M0+M1+K−1. Afterwards, the multiplexer can insert the N0 packets corresponding to the PEIT0 interval after PEIT1 and insert the N1 packets corresponding to the PEIT1 interval after PEIT2.

The transmission interval between consecutive PEITs should be no greater than the PAT transmission interval. The shorter the PEIT interval, the smaller the delay, but the larger the consumed bandwidth of the transmission line. Also, the reordering process can introduce a delay to the multiplexer though the delay is typically small. For multiplexing with long PEIT interval, the reorder buffer delay should be set to max{PEIT_interval_size(n)} in order to minimize any multiplexing jittering. PEIT_interval_size(n) is the collection of PEIT interval sizes selected by the multiplexer. If the maximum length of the PEIT interval selected by the multiplexer is 255, the delay can be about 18 ms for a transmission stream of 20 Mbps. For digital television broadcasting type applications, such a delay is typically acceptable. If the length of the program information data contained in the PEIT table exceeds the capacity of a signal transport packet, then the PEIT is divided into two or more consecutive transport packets for transmission.

Basic Mode—De-Multiplexing

Program Entry Point Search

The entries contained in the PEIT table can include PAT, PMT, CAT, network information table (NIT), transmission stream description table (TSDT), or other types of PSI information as well as information relating to other program elements. Each entry corresponds to a unique PEID (an integer that identifies one or more program elements in the transmission stream). By searching for a PEID already known to the receiver, the position of corresponding entry can be obtained from the PEIT table. The PEID for PAT, CAT, TSDT are pre-defined.

The receiver can search for the PEIT table by searching for the transport packet that has the PEIT_indicator in the network buffer. After the PEIT is found, the receiver locates and decodes PAT. In other words, after re-constructing the PEIT table, the receiver searches the PEIT table for the position of the PAT transport packet in the PEIT interval using 0x000 as a search indicator. One or more PAT transport packets can then be reconstructed to obtain a complete PAT table.

For obtaining the component list of elementary streams (e.g., video and/or audio streams) of a desired channel, the receiver searches the corresponding PMT. In particular, the receiver searches and obtains the transport packets corresponding to the PMT in the PEIT interval by using the Program_map_PEID of the desired channel to search in the PEIT table. The PMT of each program contains a list of the program elements of the program and the corresponding Elementary_PEID (corresponding to each elementary PEID). Similarly, the PEID of other program elements, such as CA_PEID (conditional acceptance PEID) from the transmission streams.

As described above, the receiver can construct a complete program element identification system of the transmission streams using the Program_map_PEID corresponding to each program number and the Elementary_PEID corresponding to each program element of the program.

Program Element Identification

Figure 4:
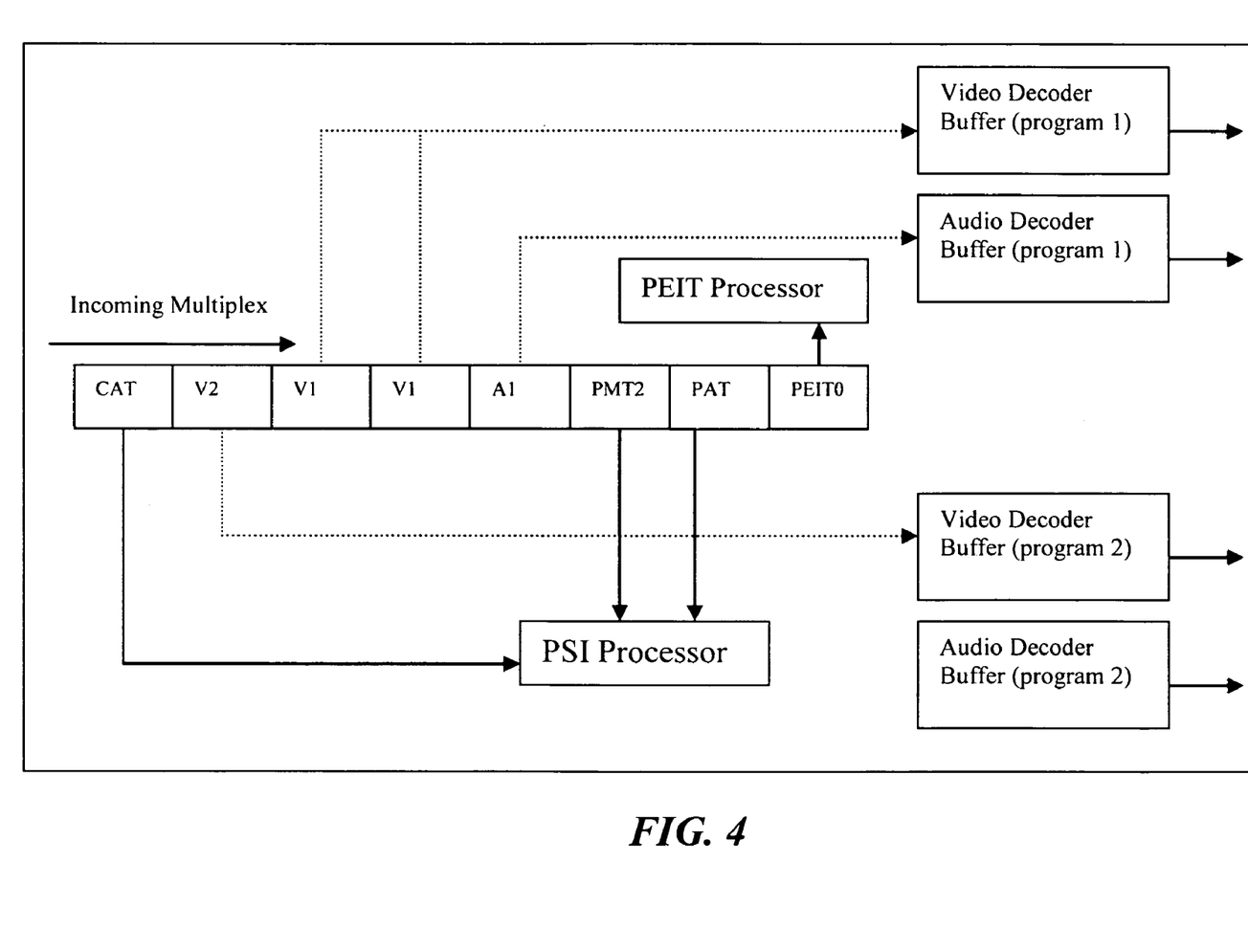
FIG. 4 is a flowchart showing a de-multiplexing process in accordance with an embodiment of the invention.

After obtaining the complete program element identification system, the de-multiplexer can identify the program elements in the transport packet sequence by decoding the PEIT table to obtain the position and sequence of transport packets in the PEIT interval. In the basic mode, the receiver presumes that the transport packets arrive according to the description in the PEIT table. Then, the receiver can analyze the received PEIT table, identify and extract program elements according to the sequencing and count information contained in the PEIT table. FIG. 4 illustrates a transmission stream that can be received at the receiver. In order to simplify the description of the de-multiplexing process, that no PEIT and transport packet loss during transmission is assumed.

As illustrated in FIG. 4, the de-multiplexer parses the PEIT table after receiving the first program element packet PEIT0. From the structure and the sequence of program elements in the PEIT table, the de-multiplexer can understand that in the PEIT interval, the first two transport packets are the PAT and the PMT table of program 2. The de-multiplexer transmits this information to the PSI processor for, e.g., constructing or updating the program list. Afterwards, the receiver receives four transport packets, and understands from the PEIT table that the number of audio packet for program 1 is 1 and that of the video packet for program 1 is 2. Accordingly, the de-multiplexer transmits these packets to the audio decoder buffer and video decoder buffer of program 1. Then, the de-multiplexer transmits packet V2 to the video decoder buffer of program 2. Finally, the transport packet CAT is transmitted to the PSI processor for extracting conditional acceptance information.

Advanced Mode—Multiplexing

The advanced mode further includes a packet locating function based on the basic mode. The locating information of the PEIT table is represented by PEIT_Seq_Num (the sequence number of the PEIT), and is located in the PEIT transport packet sequence by PEIT_Seq_Num and TP_Seq_Num. PEIT_Seq_Num is the advanced mode sequence number of the PEIT in the transmission stream, and TP_Seq_Num (transport packet sequence number) is the sequence number of the packet in the PEIT interval. If the beginning values of PEIT_Seq_Num and TP_Seq_Num are both zero, then the fifth transport packet in the second advanced mode PEIT interval has a location value of (1, 4). PEIT_Seq_Num should be reset after reaching the maximum number that its number of bits can represent. The maximum length of a PEIT interval does not exceed 255, and the sequence number locating information can be disposed in corresponding sections for transmission.

In the process of program element identification at the de-multiplexer, it is possible that the PEIT table can become unusable because of code errors. Also, it is desirable to have reduced delay at the receiver for random access of the multiplexed stream and channel switching. The error tolerance is improved by incorporating anchor packet (AP) and packet link table (PLT). AP associates its location information and linked packet (LP) that contains the same program element. The multiplexer uses the PLT table to dynamically update the location information of AP and write such information into the header of LP. When code errors occur, the de-multiplexer can identify the program elements of the linked packets by searching the reconstructed PLT table.

In the illustrated embodiment, the multiplexer selects AP and sets the anchor flag for the continuously transmitted PEIT sequence. The choices can include the transport packet corresponding to a new program element in the PEIT interval (or can be transport packets at other locations). AP sets an anchor flag to indicate its existence. The anchor flag is inserted in a corresponding section, and the location of the chosen AP packet is updated in the PLT table. The system then examines the received transport packets of all PEIT intervals after this PEIT interval. When the transport packets having the same program element reappear, the location information of AP is obtained from the updated PLT table and write to the header of these packets. For improving error tolerance, all of the transport packets in a PEIT interval should have corresponding AP information inserted. Also, this process does not affect the delay at the multiplexer because AP does not need to know the location of the next transport packet having the same program element.

Advanced Mode—De-Multiplexing

The de-multiplexing process in the advanced mode further include parsing and error correction of PLT in addition to the basic mode. The de-multiplexer examines the header information of every received transport packet. If the entry anchor_ flag indicates that the current transport packet is the AP, then the location information of this transport packet including PEIT_Seq_Num and TP_Seq_Num is written into the PLT table and the entries corresponding to the program element of this transport packet. Such a writing process is dynamic, i.e., every time when the system receives an AP having the same program element, the entries are updated.

If a code error occurs in the PEIT table of a PEIT interval, the system can still recognize the LP type transport packets. The system can search the entries in the PLT table according to the AP location (including AP_PEIT_Seq_Num and AP_TP_Seq_Num) contained in the header of the LP type transport packets. If the AP location information exists, then the corresponding program elements can be obtained from mapping the PLT table. As a result, by using the PLT table to facilitate identifying program elements, the error tolerance of the system can be improved.

Figure 5:
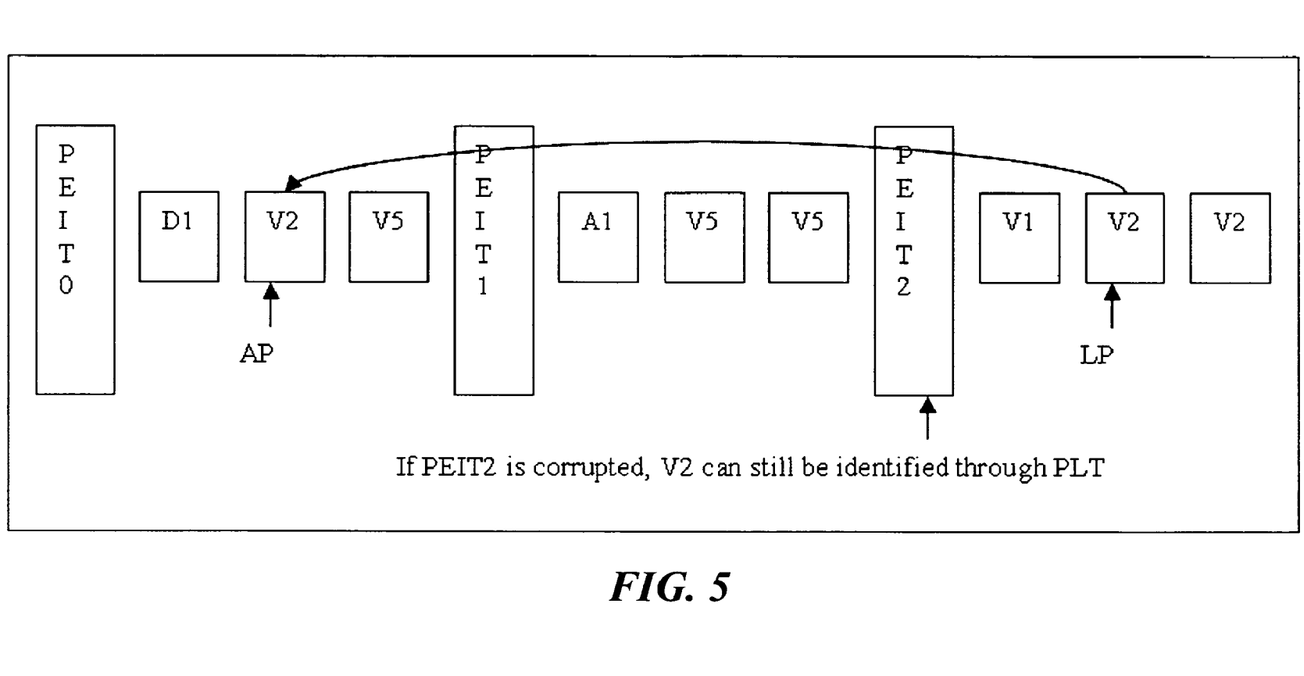
FIG. 5 is a flowchart showing a Linking mechanism with PLT technique in accordance with an embodiment of the invention.

As illustrated in FIG. 5, every PEIT interval is in the advanced mode, and the V2 packet located at (2,1) is LP and the one at (0,1) is AP. Because the header of the transport packet at (2,1) in the PEIT2 interval contains the location information of the V2 packet (0,1) in the PEIT0 interval, if error occurs in PEIT2, the transport packet at (2,1) in the PEIT2 interval can be identified from the program element type of the packet (0,1) contained in the PLT table.

In the embodiment illustrated in FIG. 5, the correspondence is one to one. In other embodiments, one LP can correspond to a plurality of AP's. For example, the PEIT table can include a field for the number of anchor packets (num_of_anchors) to represent the number of AP's in the current PEIT interval.

The following further describes the selection between the basic mode and the advanced mode.

Different network transmission condition and different multiplexing system design can have a large impact on the transmission quality. For example, when error occurs in the transmission channel, one or more transport packets or the PEIT table packet can be lost. Also, in IPTV networks having poor quality of service, the transport packets can arrive at the receiver not according to the original sequence.

In the basic mode, transport packets in a PEIT interval do not need to have any sequencing numbers or other location information. As such, the required bandwidth is reduced. In the basic mode, the location of program elements depends on the relative location of the PEIT table and the described transport packets. Because digital television broadcasting channels have a low error rate, and also because transport packets are seldom lost, the basic mode can satisfy the quality requirement. However, in other multiplexing applications, such as those for constant bit rate transmission channels, the multiplexer often inserts some filler packets into the PEIT sequence. As a result, the system needs to update the PEIT table, i.e., treating the filler packets as a unit in the PEIT table and add them into the PEIT structure to describe their locations.

The advanced mode can help to tolerate packet loss or packet sequence errors. The advanced mode can correct errors using the PLT technique, and the location of packets are achieved by having a PEIT table and sequence numbers of transport packets.

These multiplexing modes can be applied to one PEIT interval, i.e., every PEIT interval can have its own multiplexing mode to improve flexibility of the system design. The PEIT can use an anchor flag (advanced_mode_enable) to indicate the multiplexing mode of the current PEIT interval. For example, if the anchor flag advanced_mode_enable is set to 1, then the advanced mode is used, and the PEIT table has a PEIT sequence number. At the same time, the corresponding PEIT interval contains one or more AP and/or LP. Each AP and LP contains an adaptation field. The adaptation field includes the anchor flag and the location information of the AP or LP. The PEIT sequence number can be incremented in the PEIT interval that is in the advanced mode. The AP and LP transport packets are located in the PEIT interval that is in the advanced mode. In other words, if a PEIT interval only contains one AP or LP, then besides this AP or LP, other transport packets do not require any location information. Resetting a PEIT to 0 represents the beginning of a new location interval, and so the PLT table also need to be reset.

While the invention has been shown and described with reference to certain preferred embodiments thereof, it will be understood by those skilled in the art that various changes in form and details may be made therein without departing from the spirit and scope of the invention as defined by the appended claims.

We claim:

1. A method for system multiplexing and program component identification, the system including a multiplexer and a de-multiplexer, comprising:

generating a sequence of transport packets and associated program element information tables (PEIT) at the multiplexer, the multiplexer periodically collecting a sequence of packets of multiple program elements to a PEIT interval buffer, wherein a Program Element information Table (PEIT) is inserted to the PEIT interval buffer for describing position and count of individual program elements contained in the buffer, and wherein a header of a transport packets carrying a PEIT section includes a unique PEIT indicator; and locating the PEIT sections by a unique PEIT indicator contained in the transport packet header at the de-multiplexer, the de-multiplexer utilizing a corresponding program element identifier (PEID) of a program specific information (PSI) to search for a required transport packet that contains the PSI, wherein the PSI is then parsed and a complete program structure composed of various elementary streams is re-constructed, and wherein based on the program structure obtained, the de-multiplexer locates and extracts the needed elementary streams from the multiplexed stream by searching for the associated PEID's in the PEIT, and send the elementary streams to a matched elementary stream decoder for decoding, wherein the multiplexer employs a Packet Link Table (PLT) to correct errors, and wherein identification of a packet's position is achieved by using a PEIT and Transport Packet sequence number, and wherein the multiplexer associates information of an Anchor Packet (AP) with a Linked Packet (LP) that has the same program component, and further wherein the multiplexer sets PLT to update the position information of AP, and writes it into the header filed of LP.

2. The method of claim 1 wherein in case there are errors of loss in PEIT, the multiplexer recognizes a program component of the LP by searching in a reconstructed PLT.

3. The method of claim 1 wherein one LP is linked to one AP.

4. The method of claim 1 wherein one LP is linked to a plurality of AP's.

5. The method of claim 1 wherein the system includes two multiplexing modes including a basic mode that implements PEIT and an advanced mode that also includes a PLT and packet locating technique in addition to PEIT, and wherein the multiplexing mode is signaled by setting an advance mode enable flag to a syntax field in a PEIT table.

6. A system for multiplexing and program component identification, comprising:

a multiplexer for generating a sequence of transport packets and associated program element information tables (PEIT), the multiplexer periodically collecting a sequence of packets of multiple program elements to a PEIT interval buffer, wherein a Program Element information Table (PEIT) is inserted to the PEIT interval buffer for describing position and count of individual program elements contained in the buffer, and wherein a header of a transport packets carrying a PEIT section includes a unique PEIT indicator; and a de-multiplexer for locating the PEIT sections by a unique PEIT indicator contained in the transport packet header, the de-multiplexer utilizing a corresponding program element identifier (PEID) of a program specific information (PSI) to search for a required transport packet that contains the PSI, wherein the PSI is then parsed and a complete program structure composed of various elementary streams is re-constructed, and wherein based on the program structure obtained, the de-multiplexer locates and extracts the needed elementary streams from the multiplexed stream by searching for the associated PEID's in the PEIT, and send the elementary streams to a matched elementary stream decoder for decoding, wherein the multiplexer employs a Packet Link Table (PLT) to correct errors, and wherein identification of a packet's position is achieved by using a PEIT and Transport Packet sequence number, and wherein the multiplexer associates information of an Anchor Packet (AP) with a Linked Packet (LP) that has the same program component, and further wherein the multiplexer sets PLT to update the position information of AP, and writes it into the header field of LP.

* * * * *